United States Patent
Ito et al.

(10) Patent No.: US 7,193,955 B2
(45) Date of Patent: Mar. 20, 2007

(54) OPTICAL HEAD DEVICE AND OPTICAL INFORMATION REPRODUCING DEVICE

(75) Inventors: Tatsuo Ito, Osaka (JP); Teruhiro Shiono, Osaka (JP); Seiji Nishino, Osaka (JP); Hiroaki Yamamoto, Kawabe-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 588 days.

(21) Appl. No.: 10/802,464

(22) Filed: Mar. 17, 2004

(65) Prior Publication Data

US 2004/0184388 A1 Sep. 23, 2004

(30) Foreign Application Priority Data

Mar. 20, 2003 (JP) ............................. 2003-078003

(51) Int. Cl.
*G11B 7/00* (2006.01)
(52) U.S. Cl. ................ 369/112.12; 369/53.33; 369/44.41
(58) Field of Classification Search ........... 369/112.12, 369/53.33
See application file for complete search history.

(56) References Cited

U.S. PATENT DOCUMENTS

| | | | |
|---|---|---|---|
| 5,414,451 A | | 5/1995 | Maeda et al. |
| 6,424,612 B1 * | | 7/2002 | Ogawa ................. 369/124.12 |
| 6,442,125 B1 | | 8/2002 | Sugiyama et al. |
| 6,507,544 B1 * | | 1/2003 | Ma et al. ................. 369/44.41 |
| 6,807,133 B2 * | | 10/2004 | Ariyoshi et al. ......... 369/44.41 |
| 7,142,484 B2 * | | 11/2006 | Ando et al. .............. 369/44.23 |

FOREIGN PATENT DOCUMENTS

| JP | 11-242824 | 9/1999 |
|---|---|---|
| JP | 2002-319177 | 10/2002 |

* cited by examiner

*Primary Examiner*—Andrea Wellington
*Assistant Examiner*—Jorge L. Ortiz-Criado
(74) *Attorney, Agent, or Firm*—Hamre, Schumann, Mueller & Larson, P.C.

(57) ABSTRACT

An optical head device includes: an optical element collecting light reflected from a reproduction information layer (a target information layer in an optical information recording medium) and light reflected from information layers adjacent to the reproduction information layer at different positions; a light receiving element obtaining a detection signal from the reflected light collected by this optical element; and arithmetic circuitry obtaining a reproduction signal from this detection signal. The light receiving element includes: a first light receiving portion detecting a first detection signal from light containing the light reflected from the reproduction information layer; a second light receiving portion detecting a second detection signal from light reflected from a first adjacent information layer located more distant from the condensing lens than the reproduction information layer; and a third light receiving portion detecting a third detection signal from light reflected from a second adjacent information layer located closer to the condensing lens than the reproduction information layer. The arithmetic circuitry uses constants K and L determined depending on spaces between the reproduction information layer and the adjacent information layers, so as to subtract the K-times second detection signal and the L-times third detection signal from the first detection signal.

9 Claims, 3 Drawing Sheets

OPTICAL HEAD DEVICE AND OPTICAL INFORMATION REPRODUCING DEVICE

BACKGROUND OF THE INVENTION

1. Field of the Invention

The present invention relates to an optical head device and an optical information reproducing device that are used for reproducing information recorded on a magneto-optical recording medium or an optical information recording medium such as an optical disc or an optical card. Particularly, the present invention relates to an optical head device and an optical information reproducing device that are suitable for reproducing information recorded on an optical information recording medium having a plurality of information layers (e.g., a multilayer optical disc or a multilayer optical card).

2. Related Background Art

In recent years, in order to increase the recording capacity of an optical information recording medium such as an optical disc, investigations have been made for enhancing the recording density. In order to realize such an enhancement of the recording density, it has been considered to make a spot size minute, for example, and more specifically it has been considered to shorten a wavelength of a light source and to increase a numerical aperture (NA) of an objective lens. Although the wavelength of the light source is 650 nm and the NA of the objective lens is 0.6 in the present digital versatile discs.(DVD), to employ an optical system with the light source wavelength of 405 nm and the NA of the objective lens of 0.85 is suggested for next-generation optical discs. Furthermore, as an optical disc with a still increased capacity, a multilayer optical disc is now being developed, in which a plurality of information layers are superimposed in a thickness direction of the optical disc with a predetermined space therebetween.

As for the multilayer optical disc, there is a problem of interlayer crosstalk, in which, during reproduction of recorded information, a signal from another information layer is leaked in as well as a signal of a target information layer to be reproduced (hereinafter referred to as a "reproduction information layer"). Since the interlayer crosstalk decreases with an increase in distance between the reproduction information layer and other information layers, a leak of a signal from an information layer adjacent to the reproduction information layer plays a dominant role for the interlayer crosstalk. Therefore, it is possible to decrease the interlayer crosstalk to a practically sufficient low level by increasing a space between the reproduction information layer and the adjacent information layer.

However, when the space between the layers is large, a spherical aberration due to a difference in thickness of a base material (herein, the base material for each information layer generically refers to a portion located on an incident side of laser light relative to the information layer of interest in the multilayer optical disc) varies significantly between the respective information layers of the multilayer optical disc. Therefore, it is difficult to increase the number of information layers beyond a correctable range of a spherical aberration correction means. For instance, in an optical system with a light source wavelength of 405 nm and a NA of an objective lens of 0.85, about $0.01\lambda$ of spherical aberration occurs per 1 µm of an error of a base material thickness. When spaces between the respective layers are made 20 µm, it is possible to decrease the interlayer crosstalk to a sufficient level. However, in the case where the aberration correctable range of the spherical aberration correction system is 100 µm, six information layers, at most, can be laminated. For that reason, it is not appropriate that the interlayer crosstalk is suppressed by increasing a space between layers for the purpose of a still larger capacity. Therefore, the interlayer crosstalk has to be suppressed without increasing the space between the layers.

To cope with the above-stated problem, a method is proposed in which a signal light receiving area for an adjacent information layer is provided on the periphery of a signal light receiving area for a reproduction information layer and signals from the respective areas are calculated so as to cancel the interlayer crosstalk (See JP 2002-319177 A, for example). Furthermore, another method is proposed in which astigmatism is imparted to light reflected from a multilayer optical disc and a light receiving element is arranged so that light reflected from a reproduction information layer forms a circle of least confusion and light reflected from an adjacent information layer forms a focal line. In this way, a light receiving area at the focal line portion is separated optically from a light receiving area in the circle of least confusion, whereby information only from the reproduction information layer is reproduced (See JP H11(1999)-242824 A, for example). JP H11(1999)-242824 A further suggests that the light reflected from the reproduction information layer and the light reflected from the adjacent information layer are separated by using a hologram element and a signal obtained from each reflected light is calculated to cancel the interlayer crosstalk.

Since an amplitude and a frequency of the interlayer crosstalk depend on a space between a reproduction information layer and an adjacent information layer, a signal of the adjacent information layer needs to be deducted from a signal of the reproduction information layer in accordance with the space between the layers so as to remove an interlayer crosstalk component with high accuracy.

However, according to the method disclosed in JP 2002-319177 A, signals of the information layers other than the reproduction information layer are detected collectively, which are then deducted from the signal of the reproduction information layer. That is to say, a signal of the adjacent information layer disposed frontward and closer to an objective lens of an optical head device than the reproduction information layer and a signal of the other adjacent information layer disposed backward at a more distant position are not separated, and a signal for each of the adjacent information layers cannot be detected. Therefore it is difficult to cancel the interlayer crosstalk optimally for each of the adjacent information layers. For instance, in the case where a space between the frontward adjacent information layer and the reproduction information layer and a space between the backward adjacent information layer and the reproduction information layer are different due to a manufacturing error and the like, the crosstalk component cannot be removed so as to reflect the respective spaces between the layers, thus making it difficult to obtain good reproduction signals. Meanwhile, according to the method disclosed in JP H11(1999)-242824 A, each of the signals of the frontward adjacent information layer and the backward adjacent information layer is separated from the signal of the reproduction information layer. However, when the respective signals are calculated, consideration is only given to an area of the light receiving area and not to a space between the layers.

SUMMARY OF THE INVENTION

An optical head device of the present invention includes: a light source; a condensing lens that collects light emitted from the light source onto an information layer as a target among a plurality of information layers included in an optical information recording medium; an optical element that collects (a) light reflected from the target information layer and (b) light reflected from adjacent information layers that are adjacent to the target information layer at positions different from each other in the direction of optical axis; a light receiving element that detects each reflected light collected by the optical element and obtains a detection signal; and arithmetic circuitry that obtains a reproduction signal using the detection signal. The light receiving element includes: a first light receiving portion that detects a first detection signal from reflected light containing the light reflected from the target information layer; a second light receiving portion that detects a second detection signal from light reflected from a first adjacent information layer located at a position more distant from the condensing lens than the target information layer among the adjacent information layers; and a third light receiving portion that detects a third detection signal from light reflected from a second adjacent information layer located on a side closer to the condensing lens than the target information layer among the adjacent information layers. The arithmetic circuitry multiplies the second detection signal by a constant K that is determined in accordance with a space between the target information layer and the first adjacent information layer and multiplies the third detection signal by a constant L that is determined in accordance with a space between the target information layer and the second adjacent information layer, and performs a differential operation to subtract the second detection signal multiplied by K and the third detection signal multiplied by L from the first detection signal.

An optical information reproducing device of the present invention, includes: an optical head device; and a driving mechanism that drives an optical information recording medium. The optical information reproducing device includes the optical head device described as above. Note here that the optical information reproducing device of the present invention includes a recording/reproducing device that is provided with a recording mechanism for information as well as the reproducing mechanism.

DETAILED DESCRIPTION OF THE INVENTION

Figure 1:
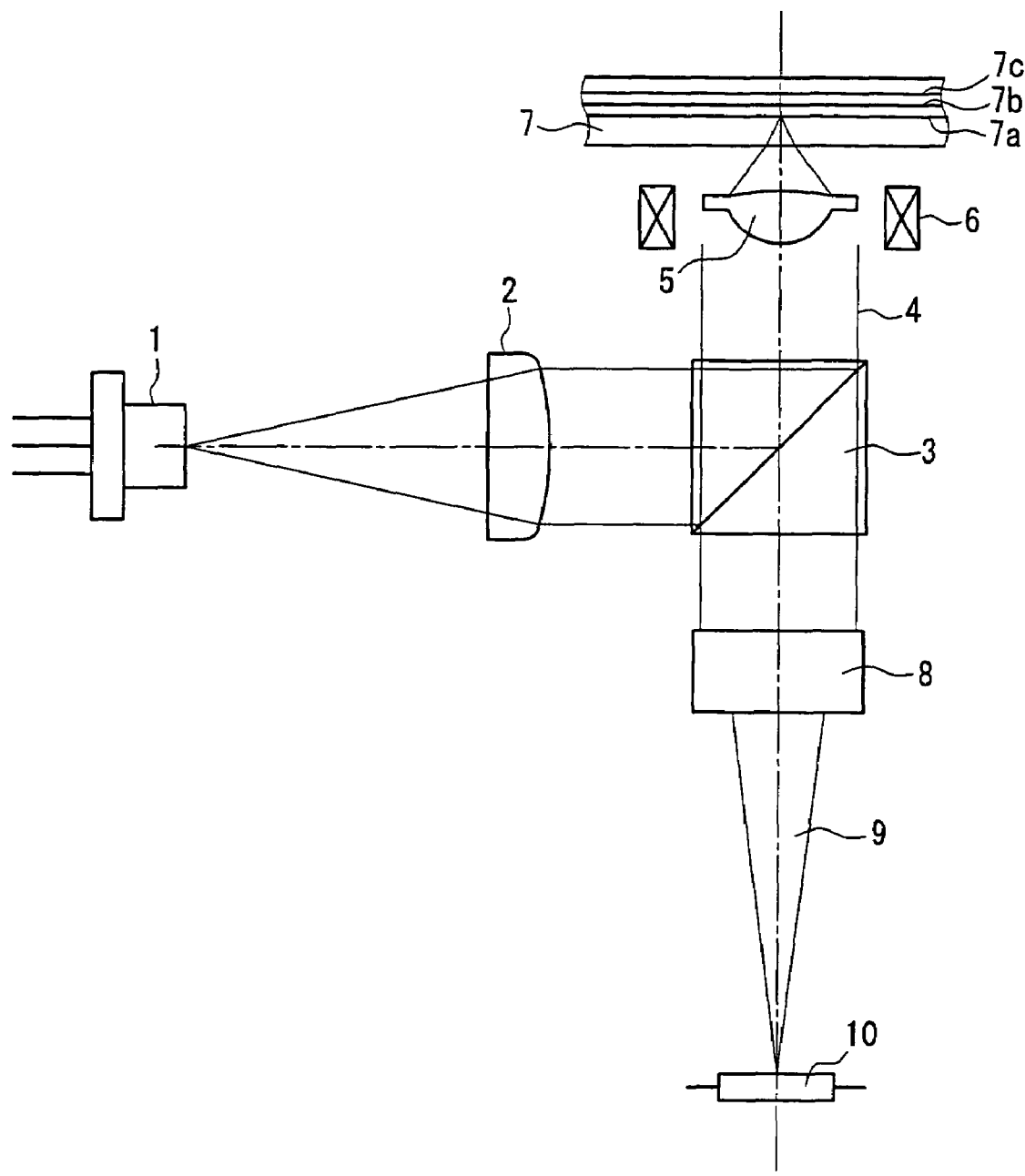
FIG. 1 schematically shows a configuration of one embodiment of the optical head device of the present invention.

According to the optical head device of the present invention, the interlayer crosstalk can be cancelled for each adjacent information layer that is adjacent to an information layer as a target of reproduction in accordance with a space between the information layer as the target of reproduction and the adjacent information layer, so that a good reproduction signal can be obtained from which the interlayer crosstalk has been cancelled.

In the optical head device of the present invention, the optical element used may be an astigmatic element that imparts astigmatism to light reflected from the optical information recording medium. In this case, the light receiving element is disposed at a position such that the light reflected from the target information layer forms a circle of least confusion on the first light receiving portion. Furthermore, the second light receiving portion and the third light receiving portion may be provided on the periphery of the first light receiving portion. The second light receiving portion may be disposed at a position where the light reflected from the first adjacent information layer becomes an ellipse and the third light receiving portion may be disposed at a position where the light reflected from the second adjacent information layer becomes an ellipse. Furthermore, in the case where the astigmatic element is used as the optical element, preferably, the first light receiving portion is made up of four light receiving patterns, the four light receiving patterns being arranged so that two opposing pairs of light receiving patterns are in directions of two focal lines. With this configuration, a focus error signal can be obtained from a first detection signal detected at the first light receiving portion.

In the optical head device of the present invention, a ratio (K/L) of the constant K to the constant L may be determined using a space between the target information layer and the first adjacent information layer and a space between the target information layer and the second adjacent information layer, and the constants K and L may be determined using the ratio.

The optical head device of the present invention, further includes memory that stores a table of optimum constants that correspond to spaces between mutually adjacent information layers, the table being determined beforehand by learning, and the constants K and L may be determined using the table so as to use a space between the target information layer and the first adjacent information layer and a space between the target information layer and the second adjacent information layer.

In the optical head device of the present invention, the constants K and L may be determined by initial learning.

In the optical head device of the present invention, the constant K, which concerns the light reflected from the first adjacent information layer and received by the light receiving element, may be determined by using a ratio of an amount of the light received by the first light receiving portion to an amount of the light received by the second light receiving portion, and the constant L, which concerns the light reflected from the second adjacent information layer and received by the light receiving element, may be determined by using a ratio of an amount of the light received by the first light receiving portion to an amount of the light received by the third light receiving portion.

The optical head device of the present invention further may include a unit for detecting a space between layers that detects spaces between mutually adjacent information layers by using focal error signals, the focal error signals being obtained by scanning the condensing lens in a direction of an optical axis with respect to the plurality information layers included in the optical information recording medium. With this configuration, the interlayer crosstalk can be cancelled optimally, because this configuration is capable of coping with a variation in thickness among the information layers and an in-plane variation in thickness among the layers.

Since the optical information reproducing device of the present invention uses the optical head device of the present invention, a good reproduction signal can be obtained in a similar manner, from which the interlayer crosstalk has been cancelled with high accuracy.

The following describes preferred embodiments of the present invention, with reference to the drawings.

Embodiment 1

One embodiment of the optical head device of the present invention will be described below. FIG. 1 schematically shows the optical head device of this embodiment, representing a state where this optical head device carries out reproduction with respect to an optical information recording medium 7. This optical head device includes a light source 1, a collimate lens 2, a beam splitter 3, an objective lens (condensing lens) 5, a driving unit 6 that drives the objective lens 5, a detecting lens (optical element) 8 and a photodetector 10. In FIG. 1, reference numeral 4 denotes parallel light and 9 denotes detection light. The optical information recording medium 7 that is a target of information reproduction in this embodiment includes three information layers, including a first information layer 7a, a second information layer 7b and a third information layer 7c that are arranged in this order from a side closer to the objective lens 5.

As the light source 1, a semiconductor laser preferably is used. In this embodiment, a semiconductor laser that emits laser light with a wavelength of 405 nm is used. The collimate lens 2 converts the laser light emitted from the light source 1 into parallel light. The beam splitter 3 branches an optical path of the parallel light converted by the collimate lens 2. The objective lens 5 collects the parallel light 4 onto any one of information layers included in the optical information recording medium 7. The driving unit 6 is a unit for driving the objective lens 5 and a voice coil motor preferably is used. The detecting lens 8 collects light reflected from the optical information recording medium 7 onto the photodetector 10. As the detecting lens 8, an astigmatic element that imparts astigmatism to light, a spherical or aspherical lens and the like, for example, are available, and the astigmatic element is preferable for the reason of separating signals of mutually adjacent layers. In this embodiment, an astigmatic element that imparts astigmatism to reflected light is used for the detecting lens 8, and a combination of a cylindrical lens and a spherical or aspherical lens, a toric lens, a combination of a spherical or aspherical lens and a parallel plate that is tilted with respect to an optical axis are available, for example. The photodetector 10 is provided with a light receiving element (not illustrated) that is disposed on a surface for receiving the detection light 9, and the light receiving element is arranged at a position such that the light reflected from the reproduction information layer forms a circle of least confusion on a first light receiving portion constituting this light receiving element, which will be described later.

Figure 2:
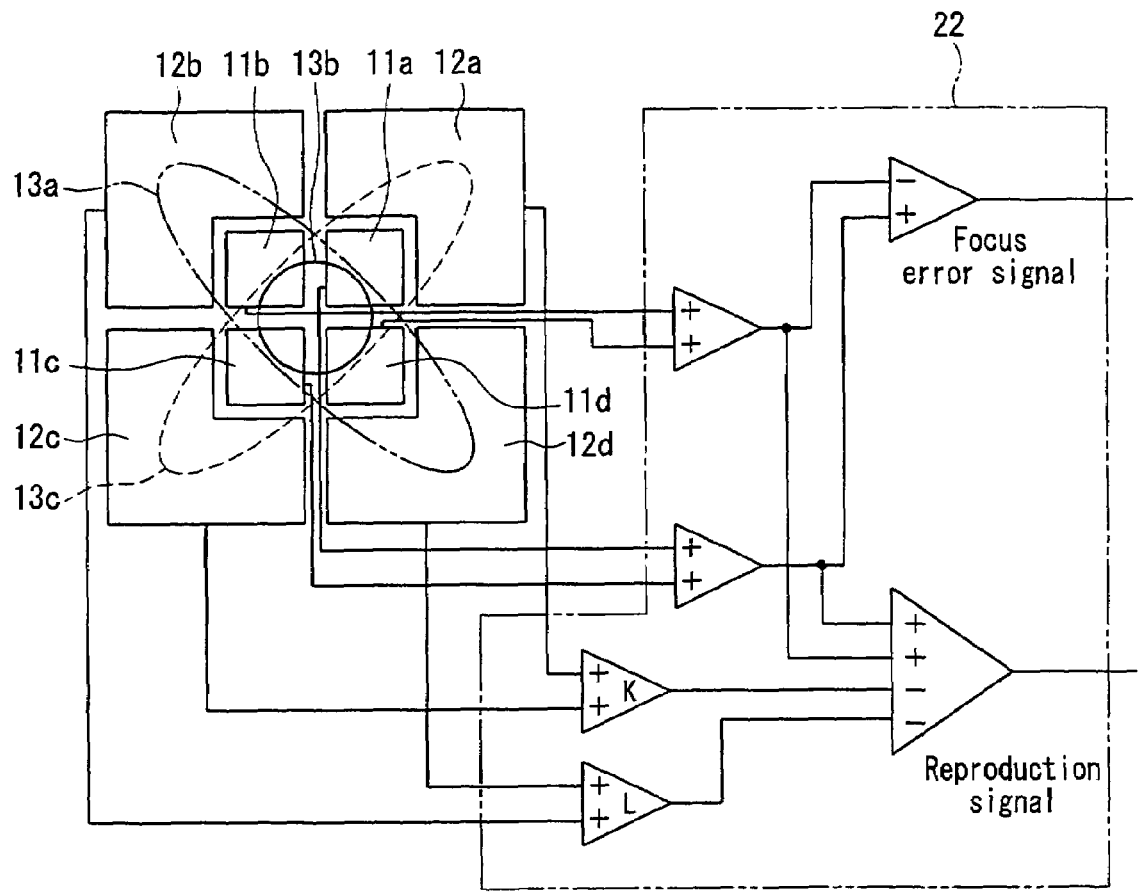
FIG. 2 shows an example of shapes of patterns in a light receiving element and an example of arithmetic circuitry that calculates a reproduction signal using a detection signal output from the light receiving element included in the optical head device of the present invention and a detection light spot detected by the light receiving element.

FIG. 2 shows the light receiving element provided in the photodetector 10 and a detection light spot. The light receiving element is provided with: first light receiving portions 11a to 11d (a light receiving area made up of four light receiving patterns 11a, 11b, 11c and 11d); second light receiving portions 12a and 12c (a light receiving area made up of two light receiving patterns 12a and 12c); and third light receiving portions 12b and 12d (a light receiving area made up of two light receiving patterns 12b and 12d). The first light receiving portions 11a to 11d are for receiving light reflected from the reproduction information layer, the second light receiving portions 12a and 12c are for receiving light reflected from a first adjacent information layer that is adjacent to the reproduction information layer (the adjacent information layer that is arranged at a more distant position from the objective lens 5 than the reproduction information layer), and the third light receiving portions 12b and 12d are for receiving light reflected from a second adjacent information layer that is adjacent to the reproduction information layer (the adjacent information layer that is arranged at a position closer to the objective lens than the reproduction information layer). The second light receiving portions 12a and 12c and the third light receiving portions 12b and 12d are disposed on the periphery of the first light receiving portions 11a to 11d.

In FIG. 2, reference numerals 13a to 13c represent detection light spots collected onto the light receiving element by the detecting lens 8. When reproduction is to be conducted with respect to the second information layer 7b of the optical information recording medium 7, the detection light spot 13a shows collected light that is reflected from the first information layer 7a (a second adjacent information layer), the detection light spot 13b shows collected light that is reflected from the second information layer 7b (a reproduction information layer) and the detection light spot 13c shows collected light that is reflected from the third information layer 7c (a first adjacent information layer).

In this embodiment, the photodetector 10 includes arithmetic circuitry 22. The arithmetic circuitry 22 of this embodiment performs operations using a detection signal obtained from the light receiving element (the first light receiving portions 11a to 11d, the second light receiving portions 12a, 12c and the third light receiving portions 12b, 12d) to calculate a reproduction signal. In addition, in this embodiment, the arithmetic circuitry 22 also calculates a focus error signal using a detection signal (a first detection signal) detected at the first light receiving portions 11a to 11d. According to this embodiment, astigmatism is imparted to the detection light 9 using the detecting lens 8, whereby light reflected from the plurality of information layers included in the optical information recording medium 7 can be received by the light receiving element with the plurality of divided areas. This allows a good reproduction signal and focus error signal to be obtained. Detailed explanations on a method for obtaining the reproduction signal and the focus error signal using the optical head of this embodiment will be described below.

As shown in FIG. 1, the light emitted from the light source 1 is converted into the parallel light 4 by the collimate lens 2, and the optical path thereof is changed toward the objective lens 5 by the beam splitter 3. The parallel light 4 is collected by the objective lens 5 so as to be collected on any one of the first through third information layers 7a, 7b and 7c of the optical information recording medium 7. The objective lens 5 is driven by the driving unit 6 along an optical axis direction, and a control unit (not illustrated) controls a space from the optical information recording medium 7. The light reflected from the optical information recording medium 7 travels via the objective lens 5 and the beam splitter 3 so as to be collected on the photodetector 10 by the detecting lens 8. The photodetector 10 detects a focus error signal using a well-known astigmatic method, whereby a servo signal required for driving the objective lens 5 can be obtained.

In FIG. 2, the detection light spot 13b shows a shape of the light reflected from the second information layer 7b when a focus of the objective lens 5 is on the second information layer 7b of the optical information recording medium 7, which is collected within the first light receiving portions 11a to 11d. A focus error signal for the second information layer 7b is obtained by subtracting a detection signal of the light receiving patterns 11b and 11d from a detection signal of the light receiving patterns 11a and 11c. Meanwhile, a reproduction signal can be obtained from the total light quantity of the detection light spot 13b, but a detection signal of the first light receiving portions 11a to 11d (the sum of detection signals obtained from the respective four light receiving patterns) includes a part of the detection light spots 13a and 13c, which is an interlayer crosstalk component mixed thereto, in addition to the detection light spot 13b.

On the third light receiving portions 12b and 12d, the detection light spot 13a from the first information layer 7a of the optical information recording medium 7 is incident partially, and on the second light receiving portions 12a and 12c, the detection light spot 13c from the third information layer 7c of the optical information recording medium 7 is incident partially. Therefore, by subtracting the detection signal at portions where the detection light spots 13a and 13c of the first and the third information layers 7a and 7c are incident on the first light receiving portions 11a and 11d from the detection signals of the first light receiving portions 11a to 11d, a reproduction signal from which the interlayer crosstalk has been cancelled can be obtained.

Then, a method for obtaining of the detection signal at the portions where the detection light spots 13a and 13c of the first and the third information layers 7a and 7c are incident on the first light receiving portions 11a to 11d will be described below specifically. As described above, the magnitude of the interlayer crosstalk is affected by a space between the reproduction information layer and an adjacent information layer. Therefore, by using a space between the second information layer 7b as the reproduction information layer and the third information layer 7c and a space between the second information layer 7b and the third information layer 7c, an interlayer crosstalk component of the detection light spots 13a and 13c can be calculated. For instance, explanations on the detection light spot 13a of the first information layer 7a as the second adjacent information layer are as follows: a ratio of the amount of light incident on the first light receiving portions 11a to 11d to the amount of light incident on the third light receiving portions 12b and 12d in the detection light spot 13a varies in accordance with the space between the first information layer 7a and the second information layer 7b. From this, by multiplying the detection signal of the third light receiving portions 12b and 12d (the sum of the detection signals of the light receiving patterns 12b and 12d) (a third detection signal) by an appropriate constant L, the interlayer crosstalk component included in the detection light spot 13a can be determined. Similarly, as for the detection light spot 13c as well, by multiplying the detection signal of the second light receiving portions (the sum of the detection signals of the light receiving patterns 12a and 12c) (a second detection signal) by an appropriate constant K, the interlayer crosstalk component included in the detection light spot 13c can be determined. By subtracting the thus determined interlayer crosstalk components from the detection signal of the first light receiving portions 11a to 11d, the interlayer crosstalk can be removed. Note here that the constants K and L are determined based on the respective spaces between the first information layer 7a, the second information layer 7b and the third information layer 7c. Examples of a method for determining the constants K and L will be explained below.

Firstly, as one example, a method for determining them using a reciprocal of the spaces between layers can be considered. In a state where the light emitted from the objective lens 5 is collected onto the reproduction information layer, a spot diameter that is defocused at the adjacent information layer being a distance d away is NA×d, where NA denotes a numerical aperture of the objective lens 5. The interlayer crosstalk from the adjacent information layer is increased with a decrease in defocused spot diameter at the adjacent information layer, which means that the interlayer crosstalk increases in inversely proportion to the square of the defocused spot diameter at the adjacent information layer. From this, a ratio of the constants K to L can be obtained by using a distance d1 between the second information layer 7b and the first information layer 7a and a distance d2 between the second information layer 7b and the third information layer 7c from the formula of $K/L=(d1/d2)^2$. By using the thus obtained ratio, the constants K and L can be determined.

As another example, a method utilizing the detection light amount by the light receiving element can be considered. As described above, in the detection light spots 13a and 13c, the ratios of the amount of the light incident on the first light receiving portions 11a to 11d to the amount of light incident on the second light receiving portions 12a and 12c and the amount of light incident on the third light receiving portions 12b and 12d 11d are different from each other in accordance with the spaces between the layers. Therefore, in accordance with the ratios, the constants K and L are each determined. The details are as follows: assuming that the detection light amounts of the first light receiving portions 11a to 11d, the second light receiving portions 12a and 12c and the third light receiving portions 12b and 12d are P(11a) to P(11d), P(12a), P(12c), P(12b) and P(12d), respectively, then the sum total T of the detection light amounts of the first through third information layers 7a to 7c can be determined by the following formula:

$$T=P(11a)+P(11b)+P(11c)+P(11d)+P(12a)+P(12b)+P(12c)+P(12d).$$

Therefore, the light amount per each information layer becomes equal to T/3. Although the interlayer crosstalk component from the first information layer 7a is in proportion to the amount of the light incident on the first light receiving portions 11a to 11d, this light amount becomes T/3−(P(12b)+P(12d)), and therefore the constant L can be determined by multiplying this by an appropriate factor of proportionality. The factor of proportionality to be used here can be selected within a range of $0 \leq L \leq (P(11a)+P(11b)+P(11c)+P(11d)-T/3)/(T/3-(P(12b)+P(12d)))$. The constant K also can be determined in a similar manner.

As still another example, there is a method in which, during learning at a stage of adjusting the optical head device, a table of optimum constants that correspond to spaces between mutually adjacent information layers is determined and stored in memory, and the constants K and L are determined by the spaces between a reproduction information layer and adjacent information layers referring to this table. In addition, in order to deal with manufacturing variations in an optical information recording medium, the constants K and L may be determined by conducting initial learning so as to reduce an error rate.

Figure 3:
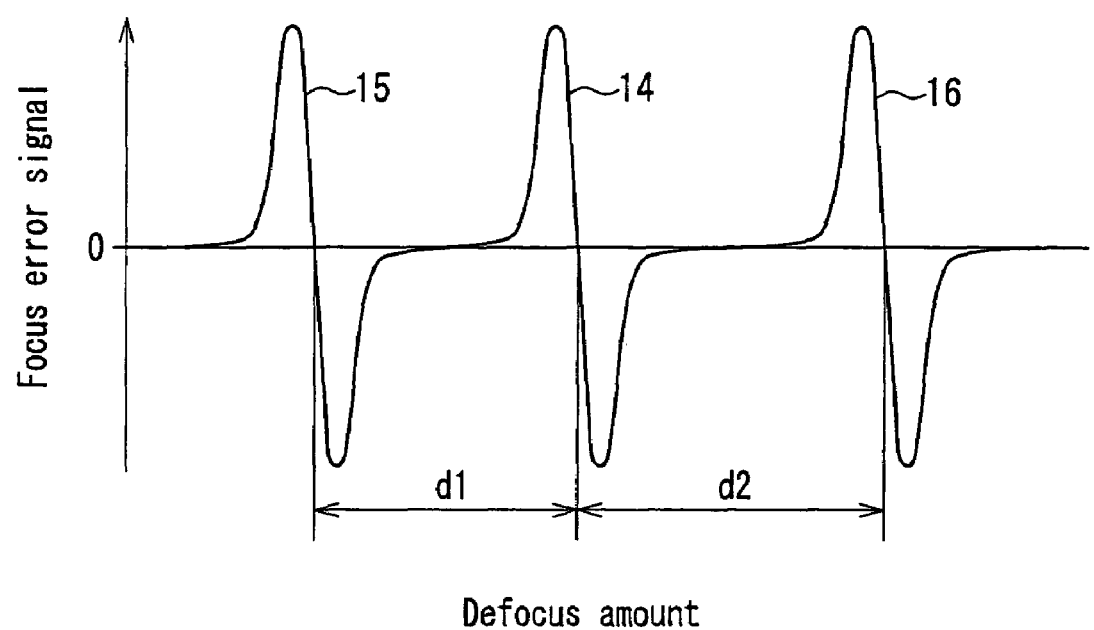
FIG. 3 is a graph showing focus error signals.

Among the above examples, the spaces between the layers should be determined beforehand depending on the method selected. Then, a method for determining the spaces between the layers using a focus error signal will be described below. FIG. 3 is a graph showing a focus error signal, where a horizontal axis represents a defocus amount as a shift amount of the objective lens 5 and a vertical axis represents the focus error signal. As described above, the focus error signal is obtained from a difference between the detection signal of the light receiving patterns 11a and 11c and the detection signal of the light receiving patterns 11b and 11d. An S-shaped curve 14 is a focus error signal that corresponds to the second information layer 7b, and an S-shaped curve 15 and an S-shaped curve 16 respectively are focus error signals that correspond to the first information layer 7a and the third information layer 7c. When the objective lens 5 is scanned in the optical axis direction by the driving unit 6, then S-shaped curves 15, 14 and 16 are obtained, and points of the respective S-shaped curves intersecting with zero represent positions where a focus of the objective lens 5 is on the information layers 7a, 7b and 7c. Thus, the spaces d1 and d2 between the respective information layers can be obtained from the driving amount by the driving unit 6 and the focus error signals. Note here that, although not illustrated in FIG. 1 and FIG. 2, in the case of the configuration for thusly obtaining the spaces between the layers from the driving amount by the driving unit 6 and the focus error signals, a unit is provided for detecting spaces between layers from a focus error signal obtained from the arithmetic circuitry 22 in the photodetector 10.

According to the above-described optical head device of this embodiment, the interlayer crosstalk can be cancelled with higher accuracy as compared with the case where the interlayer crosstalk is canceled using constants independent of the spaces between a reproduction information layer and adjacent information layers. In addition, by combining with the detection of the spaces between layers so as to carry out the detection beforehand, the optimum canceling of the interlayer crosstalk can be achieved to cope with a variation in thickness among the information layers and an in-plane variation in thickness among the layers. Here, as for the information layers included in the optical information recording medium 7, although three layers are described for the simplification of the explanations, the effects of canceling the interlayer crosstalk can be obtained similarly in the case of four or more layers included as well.

Furthermore, this embodiment explains the case where the information layer to be reproduced is neither the most forward layer nor the most backward layer of the optical information recording medium 7. However, even in the case of reproducing the most forward layer (the first information layer 7a), light reflected from the second information layer 7b is detected at the second light receiving portions 12a and 12c, whereas the reflected light is not detected at the third light receiving portions 12b and 12d, so that the optical head device of this embodiment can be applied to this case. Also, even in the case of reproducing the most backward layer (the third information layer 7c), light reflected from the second information layer 7b is detected at the third light receiving portions 12b and 12d and the second light receiving portions 12a and 12c do not detect reflected light, so that the optical head device of this embodiment can be applied to this case. Here, the constants K or L corresponding to the light receiving portions that do not detect reflected light may be set at 0.

Embodiment 2

Figure 4:
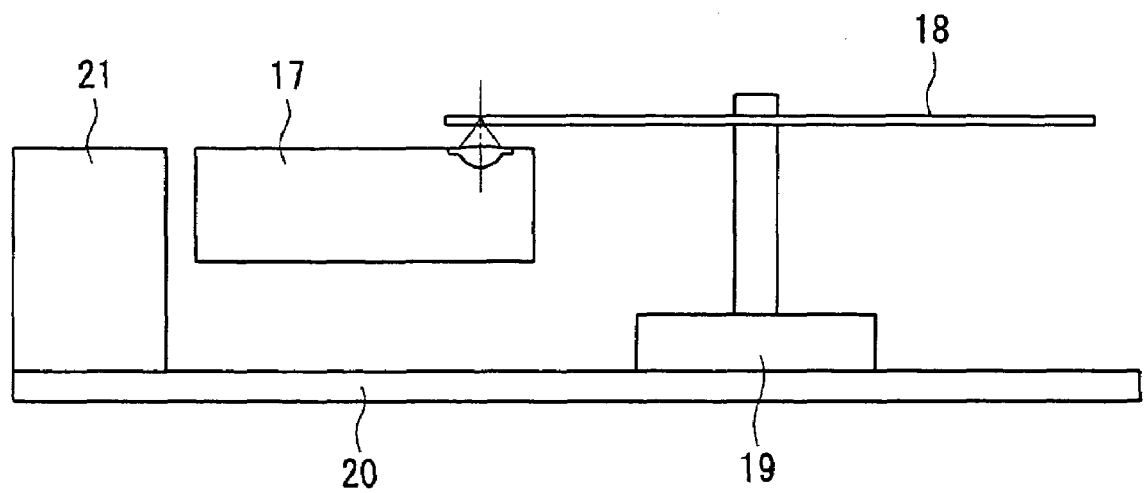
FIG. 4 schematically shows a configuration of one embodiment of the optical information reproducing device of the present invention.

The following describes one embodiment of an optical information reproducing device of the present invention, with reference to FIG. 4. The optical information reproducing device of this embodiment includes an optical head device 17 having the same configuration as that described in Embodiment 1, a motor 19 as a driving mechanism for driving an optical disc 18, a circuit board 20 and a power supply 21. The optical disc 18 is an optical recording medium with a plurality of information layers. The motor 19 is a mechanism for supporting and rotating the optical disc 18. The optical head device 17 transmits signals corresponding to a positional relationship with the optical disc 18 to the circuit board 20. The circuit board 20 has an electric circuit that outputs signals for controlling a focus servo driving mechanism (not illustrated) and a tracking servo driving mechanism (not illustrated) and for performing operations such as reading out, writing and erasing of information. The circuit board 20 calculates the signal output from the optical head device 17 that corresponds to the positional relationship between the optical disc 18 and the optical head device 17 and outputs a signal for inching the optical head device 17 or an objective lens in the optical head device 17. This signal allows the optical head device 17 or the objective lens in the optical head device 17 to perform focus servo and tracking servo with respect to the optical disc 18 and read out, write and erase information with respect to the optical disc 18. The power supply 21 may be a connecting portion with an external power supply, through which electricity is supplied to the circuit board 20, the driving mechanism of the optical head device 17 and driving devices of the motor 19 and the objective lens. Note here that the power supply or the connection terminal with the external power supply may be provided for each of the driving circuits, which does not pose any problems.

Since the optical information reproducing device of this embodiment is configured with the optical head device described in Embodiment 1, the interlayer crosstalk can be suppressed with high accuracy, and even when there is a variation in thickness among the information layers included in the optical disc 18, good reproduction characteristics can be realized with reduced interlayer crosstalk.

As described above, according to the optical head device and the optical information reproducing device of the present invention, the interlayer crosstalk can be suppressed for an optical information recording medium provided with a plurality of information layers without increasing a space between the information layers.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical head device, comprising:
a light source;
a condensing lens that collects light emitted from the light source onto an information layer as a target among a plurality of information layers included in an optical information recording medium;
an optical element that collects (a) light reflected from the target information layer and (b) light reflected from adjacent information layers that are adjacent to the target information layer at positions different from each other in the direction of optical axis;
a light receiving element that detects each reflected light collected by the optical element and obtains a detection signal; and
arithmetic circuitry that obtains a reproduction signal using the detection signal,
wherein the light receiving element comprises: a first light receiving portion that detects a first detection signal from reflected light containing the light reflected from the target information layer; a second light receiving portion that detects a second detection signal from light reflected from a first adjacent information layer located at a position more distant from the condensing lens than the target information layer among the adjacent information layers; and a third light receiving portion that detects a third detection signal from light reflected from a second adjacent information layer located on a side closer to the condensing lens than the target information layer among the adjacent information layers and the arithmetic circuitry multiplies the second detection signal by a constant K that is determined in accordance with a space between the target information layer and the first adjacent information layer and multiplies the third detection signal by a constant L that is determined in accordance with a space between the target information layer and the second adjacent information layer, and performs a differential operation to subtract the second detection signal multiplied by K and the third detection signal multiplied by L from the first detection signal.

2. The optical head device according to claim 1, wherein the optical element is an astigmatic element that imparts astigmatism to light reflected from the optical information recording medium, the light receiving element is disposed at a position such that the light reflected from the target information layer forms a circle of least confusion on the first light receiving portion, and the second light receiving portion and the third light receiving portion are provided on the periphery of the first light receiving portion, wherein the second light receiving portion is disposed at a position where the light reflected from the first adjacent information layer becomes an ellipse and the third light receiving portion is disposed at a position where the light reflected from the second adjacent information layer becomes an ellipse.

3. The optical head device according to claim 2, wherein the first light receiving portion is made up of four light receiving patterns, the four light receiving patterns being arranged so that two opposing pairs of light receiving patterns are in directions of two focal lines.

4. The optical head device according to claim 1, wherein a ratio (K/L) of the constant K to the constant L is determined using a space between the target information layer and the first adjacent information layer and a space between the target information layer and the second adjacent information layer, and the constants K and L are determined using the ratio.

5. The optical head device according to claim 1, further comprising memory that stores a table of optimum constants that correspond to spaces between mutually adjacent information layers, the table being determined beforehand by learning, wherein the constants K and L are determined using the table so as to use a space between the target information layer and the first adjacent information layer and a space between the target information layer and the second adjacent information layer.

6. The optical head device according to claim 1, wherein the constants K and L are determined by initial learning.

7. The optical head device according to claim 1, wherein the constant K, which concerns the light reflected from the first adjacent information layer and received by the light receiving element, is determined by using a ratio of an amount of the light received by the first light receiving portion to an amount of the light received by the second light receiving portion, and the constant L, which concerns the light reflected from the second adjacent information layer and received by the light receiving element, is determined by using a ratio of an amount of the light received by the first light receiving portion to an amount of the light received by the third light receiving portion.

8. The optical head device according to claim 1, further comprising a unit for detecting a space between layers that detects spaces between mutually adjacent information layers by using focal error signals, the focal error signals being obtained by scanning the condensing lens in a direction of an optical axis with respect to the plurality information layers included in the optical information recording medium.

9. An optical information reproducing device, comprising:

an optical head device; and a driving mechanism that drives an optical information recording medium, wherein the optical head device, comprises:

a light source;

a condensing lens that collects light emitted from the light source onto an information layer as a target among a plurality of information layers included in the optical information recording medium;

an optical element that collects (a) light reflected from the target information layer and (b) light reflected from adjacent information layers that are adjacent to the target information layer at positions different from each other in the direction of optical axis;

a light receiving element that detects each reflected light collected by the optical element and obtains a detection signal; and arithmetic circuitry that obtains a reproduction signal using the detection signal, wherein the light receiving element comprises: a first light receiving portion that detects a first detection signal from reflected light containing the light reflected from the target information layer; a second light receiving portion that detects a second detection signal from light reflected from a first adjacent information layer located at a position more distant from the condensing lens than the target information layer among the adjacent information layers; and a third light receiving portion that detects a third detection signal from light reflected from a second adjacent information layer located on a side closer to the condensing lens than the target information layer among the adjacent information layers, and the arithmetic circuitry multiplies the second detection signal by a constant K that is determined in accordance with a space between the target information layer and the first adjacent information layer and multiplies the third detection signal by a constant L that is determined in accordance with a space between the target information layer and the second adjacent information layer, and performs a differential operation to subtract the second detection signal multiplied by K and the third detection signal multiplied by L from the first detection signal.

* * * * *